United States Patent
Fukuda et al.

(10) Patent No.: US 9,514,291 B2
(45) Date of Patent: Dec. 6, 2016

(54) INFORMATION PROCESSING SYSTEM, INFORMATION PROCESSING DEVICE, AND AUTHENTICATION INFORMATION MANAGEMENT METHOD

(71) Applicants: Yasuharu Fukuda, Kanagawa (JP); Taku Nagumo, Kanagawa (JP); Kohta Nagai, Kanagawa (JP)

(72) Inventors: Yasuharu Fukuda, Kanagawa (JP); Taku Nagumo, Kanagawa (JP); Kohta Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 14/168,092

(22) Filed: Jan. 30, 2014

(65) Prior Publication Data

US 2014/0223535 A1     Aug. 7, 2014

(30) Foreign Application Priority Data

Feb. 6, 2013   (JP) ................................. 2013-021265

(51) Int. Cl.
  *G06F 21/31*    (2013.01)
  *G06F 21/33*    (2013.01)
  *H04L 29/06*    (2006.01)

(52) U.S. Cl.
  CPC ............. *G06F 21/31* (2013.01); *G06F 21/335* (2013.01); *H04L 63/0807* (2013.01)

(58) Field of Classification Search
  CPC ..... G06F 21/31; G06F 21/335; H04L 63/0807
  USPC ....................................................... 726/5, 10
  See application file for complete search history.

(56) References Cited

U.S. PATENT DOCUMENTS

| | | | |
|---|---|---|---|
| 8,006,309 B2 * | 8/2011 | Kikkoji et al. | 726/27 |
| 8,689,287 B2 * | 4/2014 | Bohmer et al. | 726/2 |
| 2001/0037192 A1 * | 11/2001 | Shimamoto | G06Q 30/06 704/8 |

(Continued)

FOREIGN PATENT DOCUMENTS

JP   2007-053580   3/2007

OTHER PUBLICATIONS

Maier, "Extending the Power of Consent with User-Managed Access", 2015, IEEE, p. 175-179.*

*Primary Examiner* — Morshed Mehedi
*Assistant Examiner* — Gregory Lane
(74) *Attorney, Agent, or Firm* — IPUSA, PLLC

(57) ABSTRACT

An information processing system includes a receiving unit configured to receive from an external device a use initiation request designating user specific information and organization identification information, and an authentication unit configured to issue authentication information indicating that authentication has been completed in a case where the user specific information and the organization identification information designated in the use initiation request are stored in association with each other in a first storage unit that stores one or more sets of user specific information in association with the organization identification information. The authentication unit receives a new authentication information issuance request designating the authentication information and issues new authentication information that can be used even after a user termination request designating the authentication information is made.

8 Claims, 16 Drawing Sheets

(56) References Cited

U.S. PATENT DOCUMENTS

| | | | |
|---|---|---|---|
| 2005/0021959 A1* | 1/2005 | Tsushima et al. | 713/170 |
| 2010/0281524 A1* | 11/2010 | Ghittino et al. | 726/5 |
| 2011/0099384 A1* | 4/2011 | Grange | H04L 9/0897 713/184 |
| 2011/0289420 A1* | 11/2011 | Morioka et al. | 715/738 |
| 2012/0272188 A1* | 10/2012 | Kunitake et al. | 715/811 |

\* cited by examiner

FIG.5

| ORGANIZATION ID | ORGANIZATION NAME | COUNTRY | LANGUAGE | ADDRESS INFORMATION | ... |
|---|---|---|---|---|---|
| XXX | COMPANY A | JAPAN | JAPANESE | CompanyA@print.com | |
| YYY | COMPANY B | U.S.A. | ENGLISH | CompanyB@print.com | |

FIG.6

| ORGANIZATION ID | USER ID | PASSWORD | ADDRESS INFORMATION | ... |
|---|---|---|---|---|
| XXX | User A | AAA | A@aaa.com | |
| | User B | BBB | B@aaa.com | |
| | User C | CCC | C@aaa.com | |
| YYY | User A | AAA | A@bbb.com | |
| | User D | DDD | D@bbb.com | |

FIG.7

| ORGANIZATION ID | DEVICE AUTHENTICATION INFORMATION | OFFICE INFORMATION | CAPABILITY | ... |
|---|---|---|---|---|
| XXX | 111 | OFFICE A | A4 COLOR | |
| | 222 | OFFICE B | A2 COLOR | |
| | 333 | OFFICE B | A4 BLACK & WHITE | |
| YYY | 444 | — | A4 COLOR | |

| ORGANIZATION ID | USER ID | TICKET |
|---|---|---|
| ORGANIZATION A | USER A | AUTHENTICATION TICKET 1 |
| ORGANIZATION A | USER A | AUTHENTICATION TICKET 2 |
| ORGANIZATION A | USER B | AUTHENTICATION TICKET 3 |
| ORGANIZATION X | USER X | AUTHENTICATION TICKET 4 |
|  |  |  |

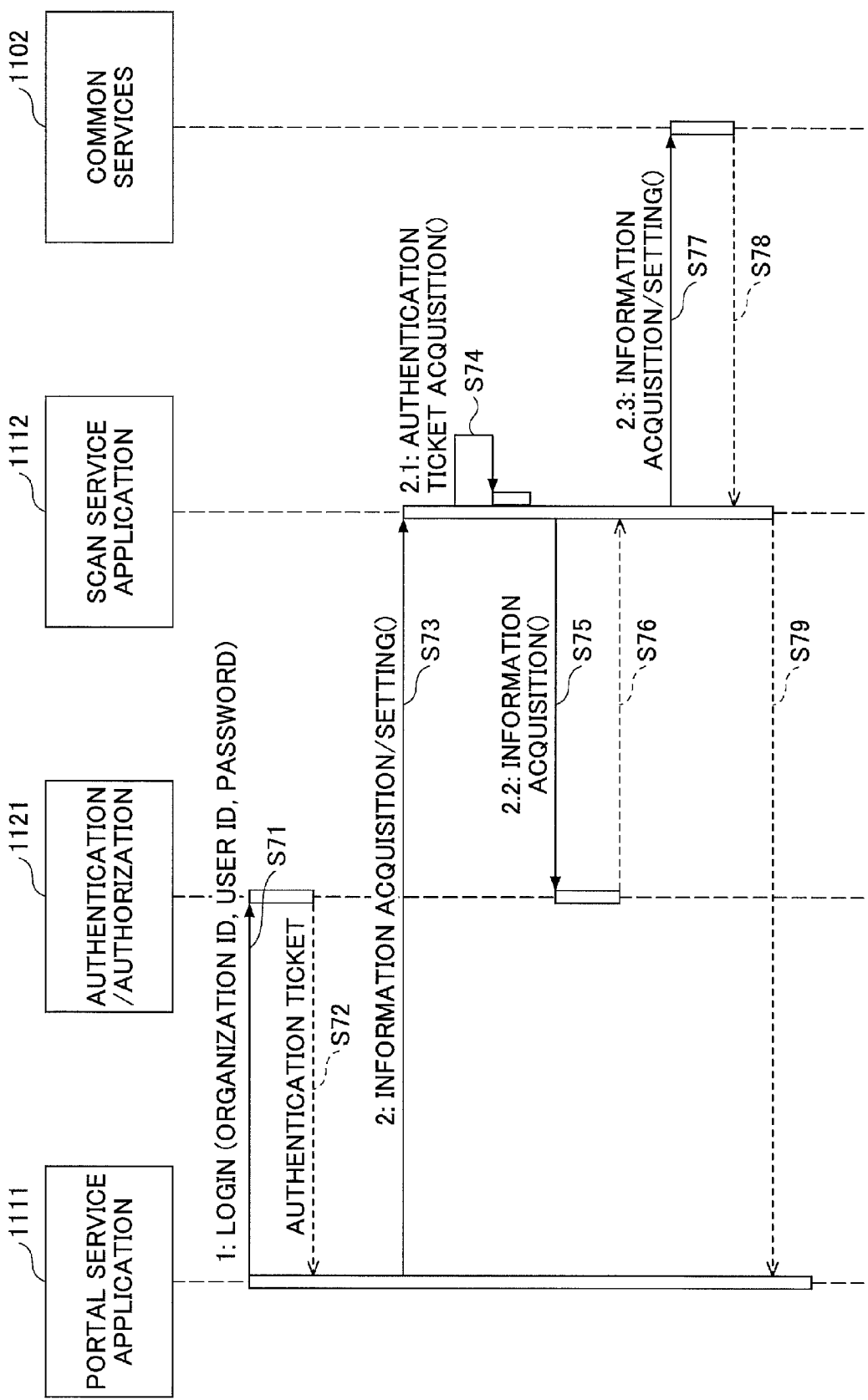

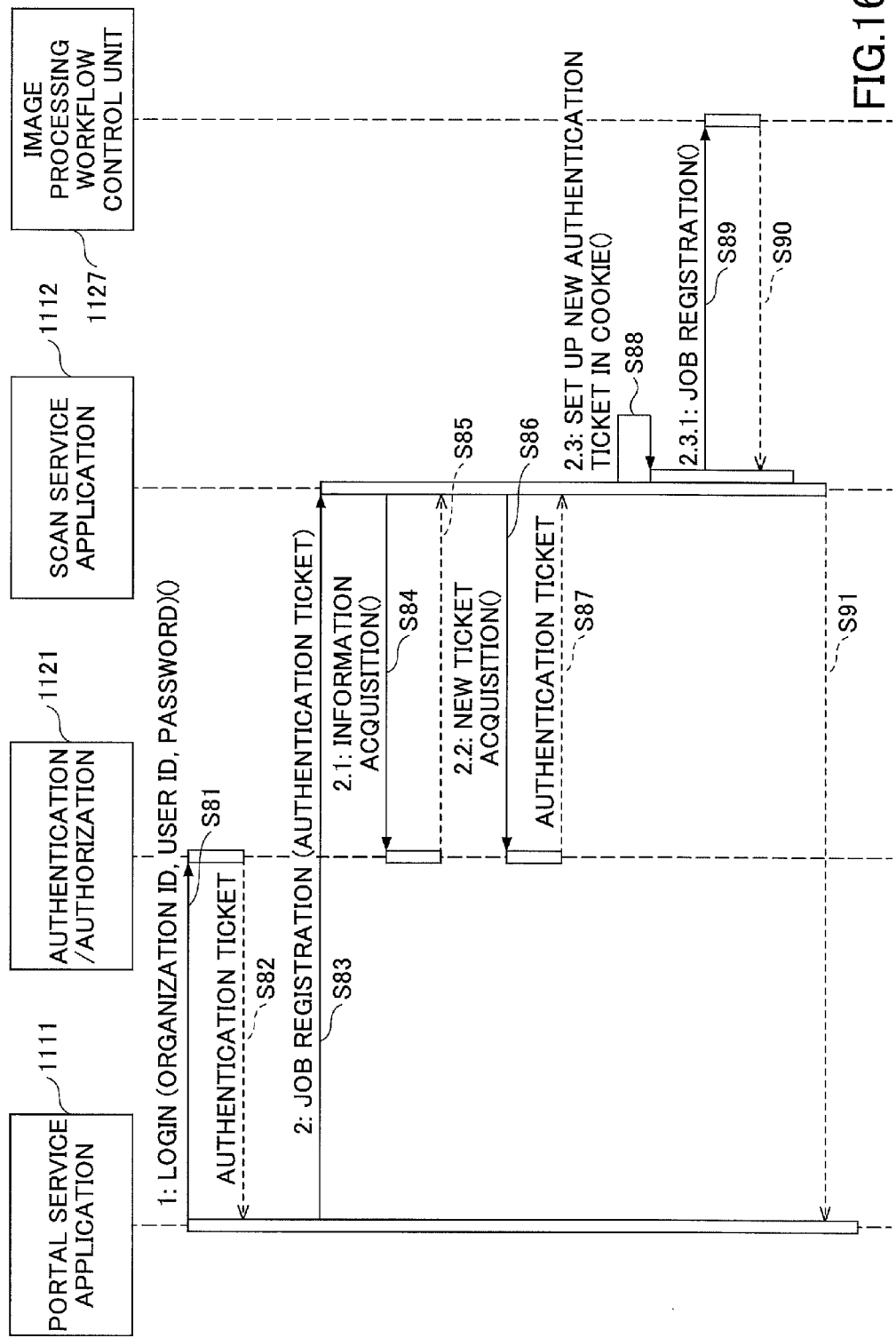

FIG.17

```
{
  "_id":"Job ID,
  "tasks":[
    {
      "_id":"Task ID,
      "job_id":"Parent job ID,
      "type":"XXXDrive",
      "params":{
        "folder_id":"Folder ID of storage destination",
        "filename":"File name to be used to store file",
        "organization_id":"Organization ID",
        "federation_id":"Federation ID",
        "file":"Source of file to be stored"
      }
    }
  ],
  "user_id":"User ID",
  "organization_id":"Organization ID",
  "app_id":"Application ID",
  "callback_uri":"Callback URL",
  "callback_headers":{"Cookie":"Cookie information required for callback"}
}
```

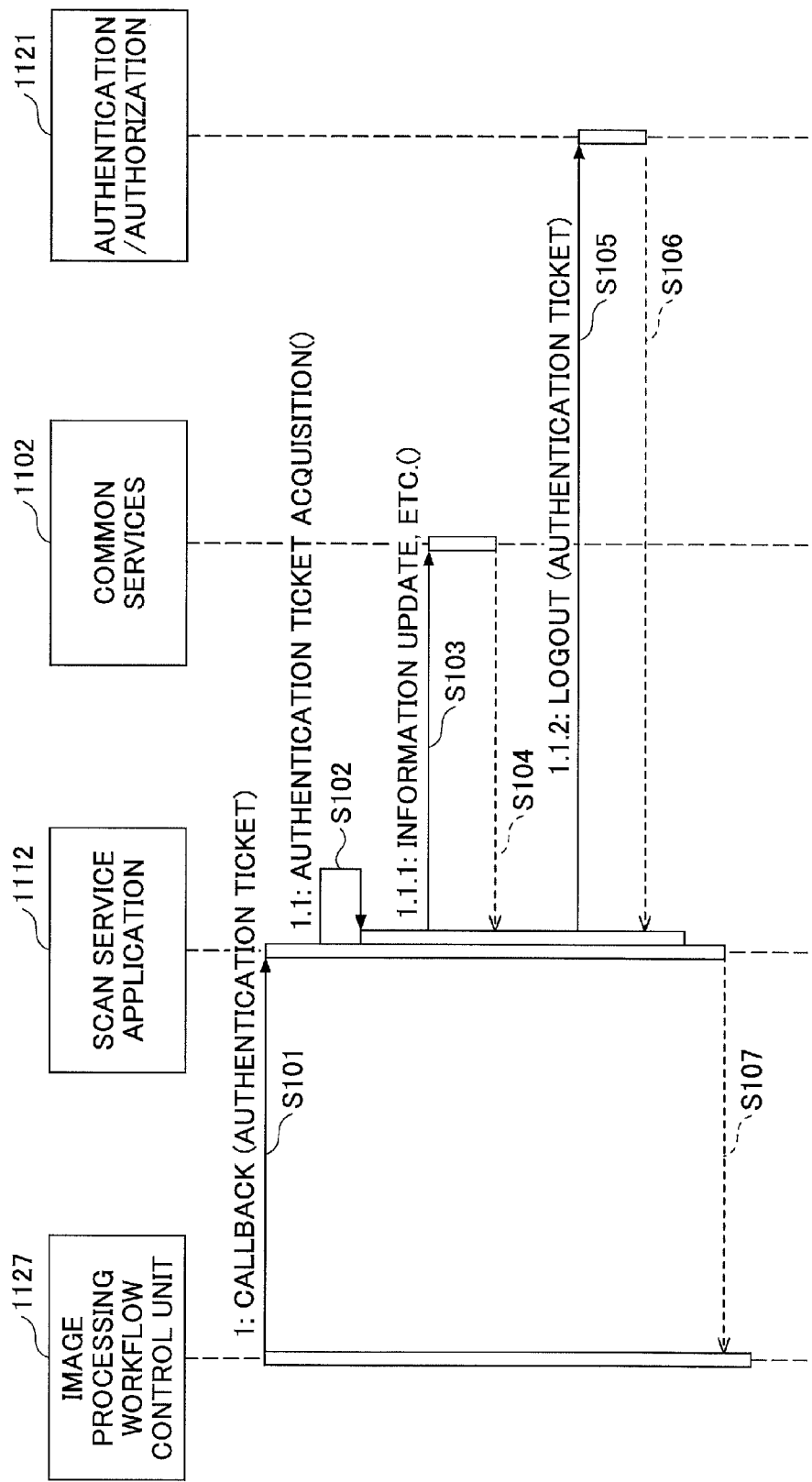

INFORMATION PROCESSING SYSTEM, INFORMATION PROCESSING DEVICE, AND AUTHENTICATION INFORMATION MANAGEMENT METHOD

BACKGROUND OF THE INVENTION

1. Field of the Invention

The present invention relates to an information processing system, an information processing device, and an authentication information management method.

2. Description of the Related Art

In recent years, network systems (web systems) such as a LAN (local area network) and an intranet are set up to enable a client terminal connected to a network to use various web services that are provided by a web server using a web browser.

In such a web system, a user typically inputs a login name (account) and a password upon requesting authentication by an authentication service from a web browser. The web system passes the login name and password input by the user to the authentication service and provides an authentication ticket to a web service so that the user may be allowed to use a function of the web service (see e.g., Japanese Laid-Open Patent Publication No. 2007-53580).

A client making a request to a server for a service such as data conversion or data processing provides the server with a valid authentication ticket issued in response to a user login operation and uses a function of the server under the authority of the logged in user. Note that some processes such as data conversion or data processing that are executed by the server may require a long process time.

However, the client using a function of the server under the authority of the logged in user may be unable to continue using the function of the server once the user logs out.

Accordingly, a technique is desired for enabling continuation of a process executed under the authority of a user even after the user logs out.

SUMMARY OF THE INVENTION

According to an aspect of the present invention, an information processing system including one or more information processing devices is provided. The information processing system includes a receiving unit configured to receive from an external device a use initiation request designating user specific information and organization identification information, and an authentication unit configured to issue authentication information indicating that authentication has been completed in a case where the user specific information and the organization identification information designated in the use initiation request are stored in association with each other in a first storage unit that stores one or more sets of user specific information in association with the organization identification information. The authentication unit receives a new authentication information issuance request designating the authentication information and issues new authentication information that can be used even after a user termination request designating the authentication information is made.

According to an aspect of the present invention, a process executed under the authority of a user may be continued even after the user makes a use termination request.

BRIEF DESCRIPTION OF THE DRAWINGS

FIG. 5 is a table illustrating an exemplary data configuration of organization information;

FIG. 6 is a table illustrating an exemplary data configuration of user information;

FIG. 7 is a table illustrating an exemplary data configuration of device information;

FIG. 15 is a sequence chart illustrating an exemplary information acquisition/setting process;

FIG. 16 is a sequence chart illustrating an exemplary job registration process;

FIG. 17 illustrates an exemplary data configuration of job information; and

FIG. 18 is a sequence chart illustrating an exemplary callback process.

DETAILED DESCRIPTION OF THE PREFERRED EMBODIMENTS

In the following, embodiments of the present invention are described with reference to the accompanying drawings.

First Embodiment

System Configuration

Figure 1:
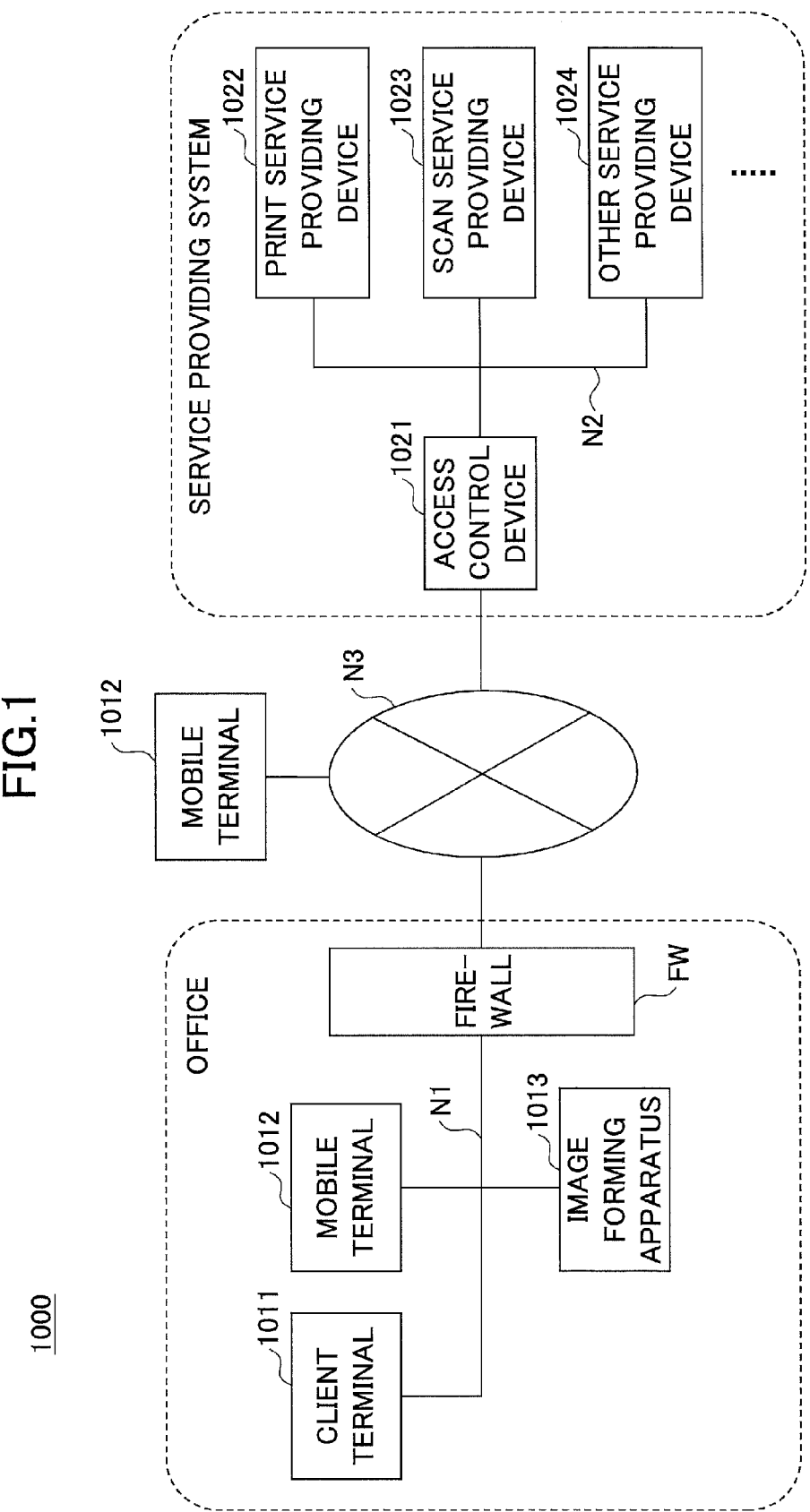
FIG. 1 illustrates an exemplary configuration of an information processing system according to a first embodiment.

FIG. 1 is a configuration diagram of an example of an information processing system according to a first embodiment. The information processing system 1000 illustrated in FIG. 1 includes, for example, a network N1 such as a network in an office, a network N2 of a service providing system represented by a cloud service, and a network N3 such as the Internet.

The network N1 is a private network behind a firewall FW. The firewall FW is installed at the contact point between the network N1 and the network N3, and detects and blocks unauthorized access. A client terminal 1011, a mobile terminal 1012, and an image forming apparatus 1013, such as a multifunction peripheral, are connected to the network N1.

The client terminal 1011 is an example of a terminal device. The client terminal 1011 is realized by an information processing device having a typical OS installed therein. The client terminal 1011 includes a unit for performing radio communication or a unit for performing cable communication. The client terminal 1011 is a terminal that can be operated by a user, such as a tablet PC and a notebook PC.

The mobile terminal 1012 is an example of a terminal device. The mobile terminal 1012 includes a unit for performing radio communication or a unit for performing cable communication. The mobile terminal 1012 is a terminal that may be carried by a user, such as a smartphone, a mobile phone, a tablet PC, and a notebook PC.

The image forming apparatus 1013 is a device having an image forming function, such as a multifunction peripheral. The image forming apparatus 1013 includes a unit for performing radio communication or a unit for performing cable communication. The image forming apparatus 1013 is a device for performing processes relevant to image formation, such as a multifunction peripheral, a copier, a scanner, a printer, a laser printer, a projector, and an electronic blackboard. FIG. 1 illustrates an example including one of each of the client terminal 1011, the mobile terminal 1012, and the image forming apparatus 1013; however, there may be a plurality of each of these devices.

The network N2 is connected to the network N3 by an access control device 1021. The security of the network N2 is protected by the access control device 1021. A print service providing device 1022, a scan service providing device 1023, and another service providing device 1024 are connected to the network N2.

In the information processing system 1000 of FIG. 1, the access control device 1021, the print service providing device 1022, the scan service providing device 1023, and the other service providing device 1024 realize a service providing system. The print service providing device 1022, the scan service providing device 1023, and the other service providing device 1024 provide a print service, a scan service, and other services.

The access control device 1021 controls the operation of logging into a print service provided by the print service providing device 1022 or a scan service provided by the scan service providing device 1023, for example.

The access control device 1021, the print service providing device 1022, the scan service providing device 1023, and the other service providing device 1024 are realized by one or more information processing devices.

The access control device 1021, the print service providing device 1022, the scan service providing device 1023, and the other service providing device 1024 may be realized by being integrated in a single information processing device, or may be realized by being distributed across a plurality of information processing devices.

Part of the services on the network N2 side may be outside the network N2. The mobile terminal 1012 may be outside the network N1; namely, outside the office network, for example. In the information processing system 1000 illustrated in FIG. 1, one mobile terminal 1012 is connected to the network N1 and another mobile terminal 1012 is connected to the network N3.

Figure 2:
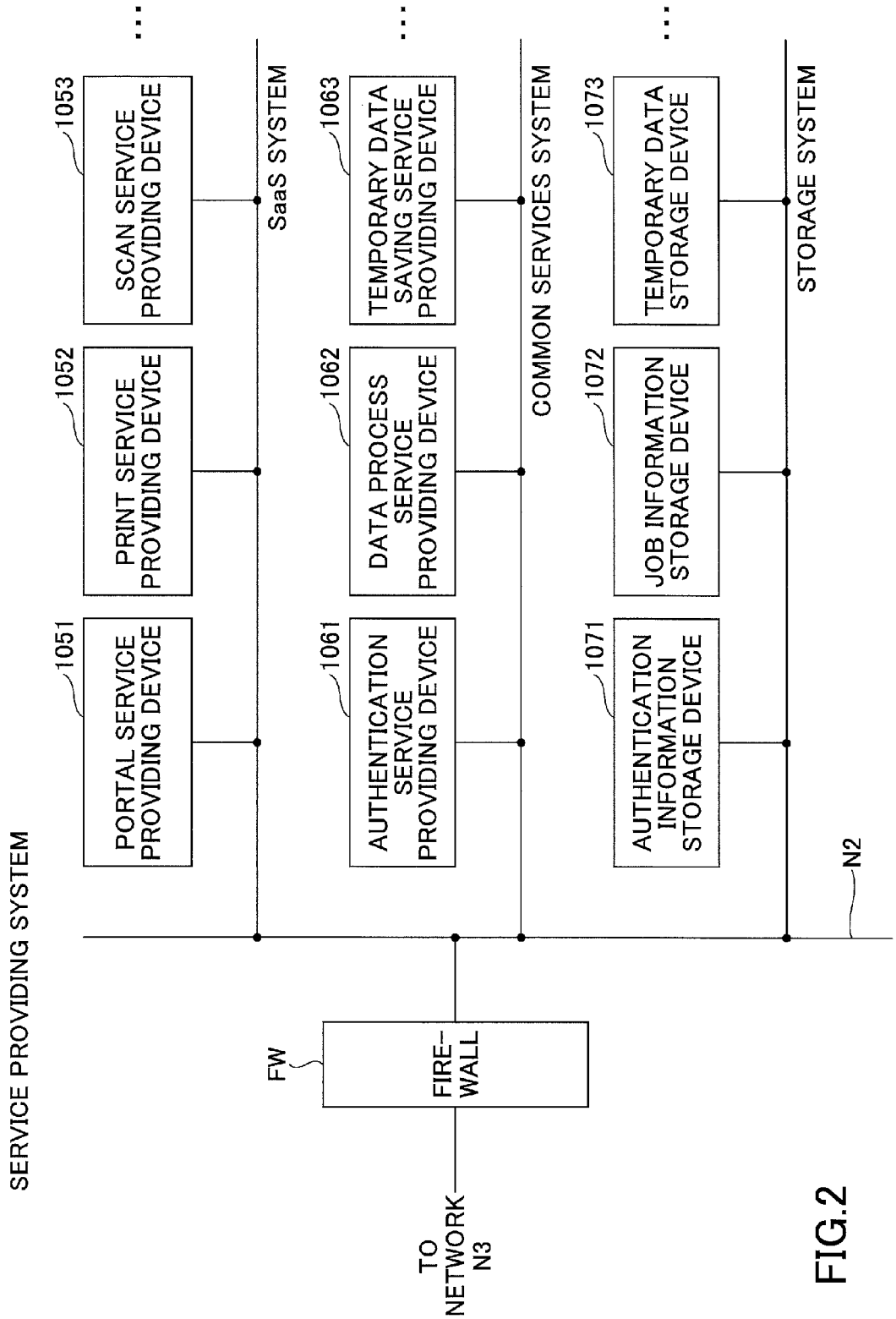
FIG. 2 illustrates an alternative configuration of a service providing system.

The configuration of the service providing system illustrated in FIG. 1 is merely one example; that is, the service providing system may alternatively have a configuration as illustrated in FIG. 2, for example. FIG. 2 is a configuration diagram of another example of the service providing system. In the service providing system of FIG. 2, the network N2 is connected to the network N3 by a firewall FW.

In the network N2, service providing devices of a SaaS (Software as a Service) system, service providing devices of a common service (Network Service Platform) system, and storage devices of a storage system are connected. The service providing device of a common service system provides a service that can be commonly used by the service providing devices of the SaaS system.

The service providing devices of the SaaS system include service providing devices according to the service to be provided, such as a portal service providing device 1051, a print service providing device 1052, and a scan service providing device 1053. Furthermore, the service providing devices of the common service system include service providing devices according to a common service to be provided, such as an authentication service providing device 1061, a data process service providing device 1062, and a temporary data saving service providing device 1063. The storage devices of the storage system include storage devices according to the information (data) to be stored, such as an authentication information storage device 1071, a job information storage device 1072, and a temporary data storage device 1073.

In the service providing system of FIG. 2, security is protected by authentication services provided by, for example, the firewall FW and the authentication service providing device 1061. Note that the configuration of the service providing system of FIG. 2 is also one example, and the service providing system may have other configurations.

<Hardware Configuration>

Figure 3:
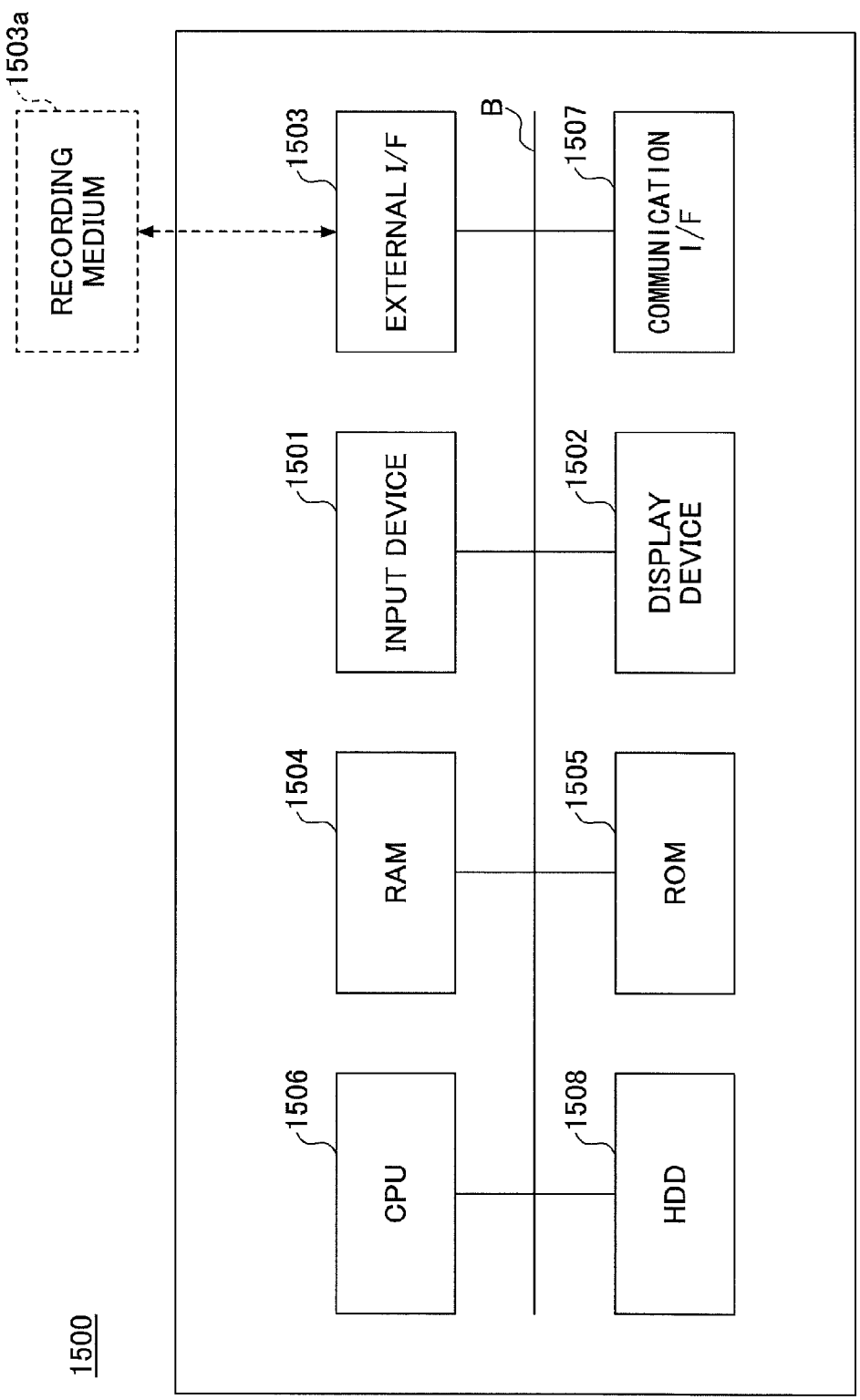
FIG. 3 illustrates an exemplary hardware configuration of a computer system.

The client terminal 1011, the mobile terminal 1012, the access control device 1021, the print service providing device 1022, the scan service providing device 1023, and the other service providing device 1024 are realized by, for example, a computer system having a hardware configuration as illustrated in FIG. 3.

The service providing devices of the SaaS system, the service providing devices of the common service system, and the storage devices of the storage system illustrated in FIG. 2 may also be realized by, for example, a computer system having a hardware configuration as illustrated in FIG. 3.

FIG. 3 is a hardware configuration diagram of an example of a computer system. A computer system 1500 illustrated in FIG. 3 includes an input device 1501, a display device 1502, an external I/F 1503, a RAM (Random Access Memory) 1504, a ROM (Read-Only Memory) 1505, a CPU (Central Processing Unit) 1506, a communication I/F 1507, and a HDD (Hard Disk Drive) 1508, which are interconnected by a bus B.

The input device 1501 includes a keyboard, a mouse, and a touch panel, which are used by the user for inputting operation signals. The display device 1502 includes a display, etc., and displays processing results obtained by the computer system 1500.

The communication I/F 1507 is an interface for connecting the computer system 1500 to the networks N1 through N3. Accordingly, the computer system 1500 can perform data communication via the communication I/F 1507.

The HDD 1508 is a nonvolatile storage device storing programs and data. Examples of the stored programs and data are an OS (Operating System) which is the basic software for controlling the entire computer system 1500, and application software for providing various functions in the OS.

The HDD 1508 manages the stored programs and data by a predetermined file system and/or a DB (database). The external I/F 1503 is an interface between the computer system 1500 and an external device. An example of the external device is a recording medium 1503*a*. Accordingly, the computer system 1500 can read data from and/or write data in the recording medium 1503*a* via the external I/F 1503. Examples of the recording medium 1503*a* are a flexible disk, a CD (Compact Disk), a DVD (Digital Versatile Disk), an SD memory card, and a USB memory (Universal Serial Bus memory).

The ROM 1505 is a nonvolatile semiconductor memory (storage device) that can hold programs and data even after the power is turned off. The ROM 1505 stores programs and data such as BIOS (Basic Input/Output System) that is executed when the computer system 1500 is activated, OS settings, and network settings. The RAM 1504 is a volatile semiconductor memory (storage device) for temporarily storing programs and data.

The CPU 1506 is a processor that controls and executes overall operations and functions of the computer system 1500 by loading programs and data from storage devices such as the ROM 1505 and the HDD 1508 into the RAM 1504 and executing relevant processes, for example.

The client terminal 1011, the mobile terminal 1012, the access control device 1021, the print service providing device 1022, the scan service providing device 1023, and the other service providing device 1024 can realize various processes as described below, by the hardware configuration of the computer system 1500. Furthermore, the service providing device of the SaaS system, the service providing device of the common service system, and the storage device of the storage system can also realize various processes as described below, by the hardware configuration of the computer system 1500. Note that descriptions of hardware configurations of the image forming apparatus 1013 and the firewall FW illustrated in FIG. 1 are omitted.

<Software Configuration>
<<Service Providing System>>

Figure 4:
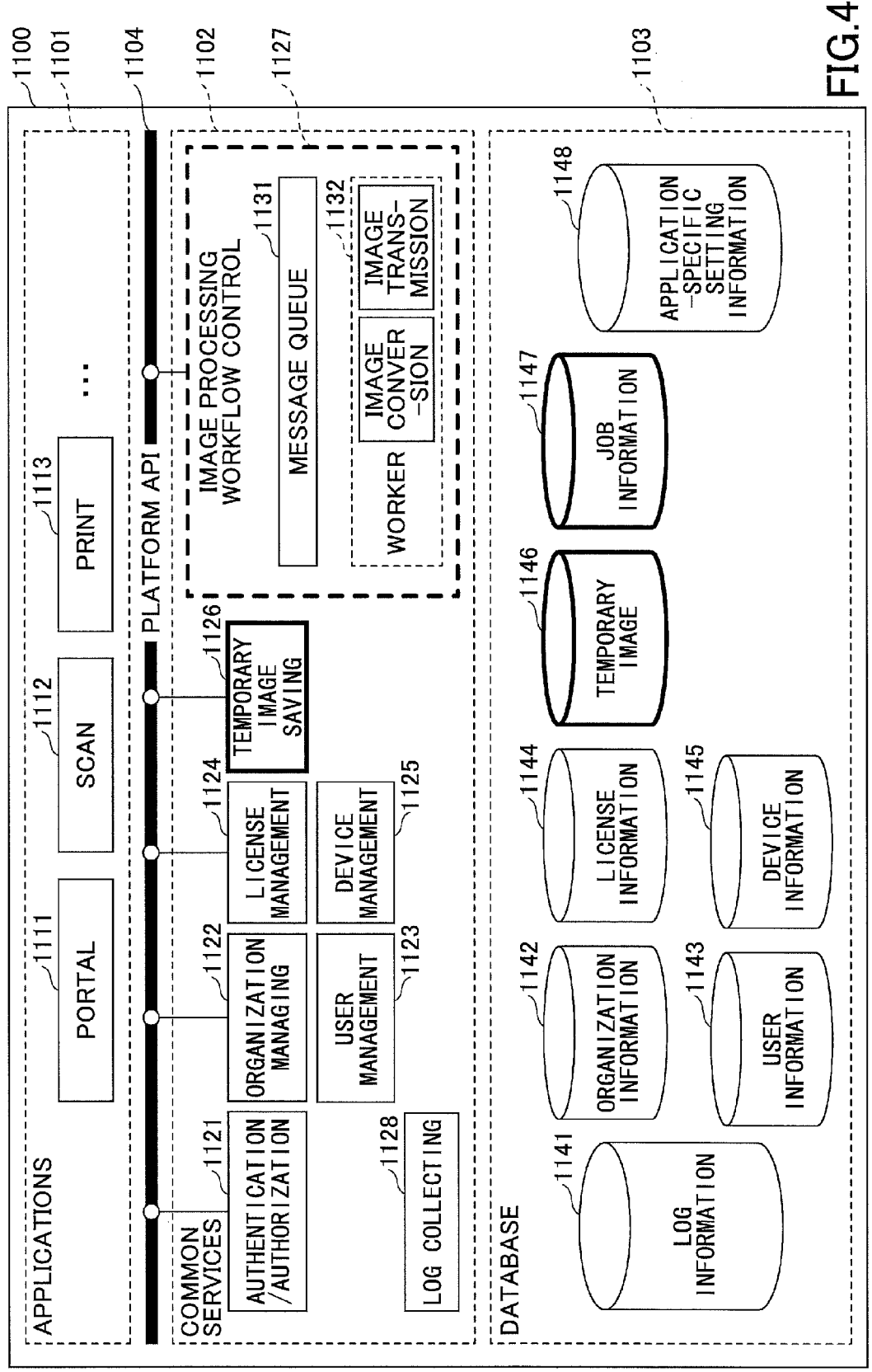
FIG. 4 is a block diagram illustrating an exemplary functional configuration of the service providing system according to the first embodiment.

The service providing system according to the first embodiment is realized by, for example, process blocks as illustrated in FIG. 4. FIG. 4 is a process block diagram of an example of a service providing system according to the first embodiment.

A service providing system 1100 realizes applications 1101, common services 1102, a database (DB) 1103, and a platform API (Application Programming Interface) 1104, by executing programs.

The applications 1101 include, for example, a portal service application 1111, a scan service application 1112, and a print service application 1113.

The portal service application 1111 is an application for providing a portal service. A portal service provides a service acting as an entrance for using the service providing system 1100. The scan service application 1112 is an application for providing a scan service. The print service application 1113 is an application for providing a print application. The applications 1101 may include other service applications.

The platform API 1104 is an interface for using the common services 1102 by the applications 1101, by the portal service application 1111, the scan service application 1112, and the print service application 1113. The platform API 1104 is an interface that is defined in advance, which is provided for the common services 1102 to receive requests from the applications 1101. The platform API 1104 may include functions and classes, for example.

The platform API 1104 may be realized by, for example, a Web API that can be used via the network, in a case where the service providing system 1100 includes a plurality of information processing devices.

The common services 1102 include an authentication/authorization unit 1121, an organization management unit 1122, a user management unit 1123, a license management unit 1124, a device management unit 1125, a temporary image saving unit 1126, an image processing workflow control unit 1127, and a log collection unit 1128.

Furthermore, the image processing workflow control unit 1127 includes a message queue 1131, and at least one worker 1132. The worker 1132 realizes functions such as image conversion and image transmission.

The authentication/authorization unit 1121 executes authentication/authorization based on a login request from office devices such as the client terminal 1011 and the image forming apparatus 1013. The term "office device" is used below as a generic term for devices used at the office such as the client terminal 1011, the mobile terminal 1012, and the image forming apparatus 1013.

The authentication/authorization unit 1121 authenticates/authorizes a user by accessing, for example, a user information storage unit 1143 and a license information storage unit 1144, which are described below. Also, the authentication/authorization unit 1121 authenticates, for example, the image forming apparatus 1013 by accessing, for example, an organization information storage unit 1142, the license information storage unit 1144, and a device information storage unit 1145, described below. The authentication/authorization unit 1121 authenticates/authorizes a login request and returns an authentication ticket.

The organization management unit 1122 manages organization information stored in the organization information storage unit 1142 described below. The user management unit 1123 manages user information stored in the user information storage unit 1143 described below.

The license management unit 1124 manages license information stored in the license information storage unit 1144 described below. The device management unit 1125 manages device information stored in a device information storage unit 1145 described below. The temporary image saving unit 1126 saves temporary images in a temporary image storage unit 1146 described below, and acquires temporary images from the temporary image storage unit 1146.

The image processing workflow control unit 1127 controls a workflow relevant to image processing, based on a request from the applications 1101. The message queue 1131 includes a queue corresponding to the type of process. The image processing workflow control unit 1127 submits the message of the request relevant to the process (job), in the queue corresponding to the type of the job.

The worker 1132 monitors the corresponding queue. When a message is submitted in the queue, the worker 1132 performs a process such as image conversion and image transmission according to the type of the corresponding job. Note that the submitted message may be subjectively read (pulled) by the worker 1132, or may be provided (pushed) from the queue to the worker 1132.

The database 1103 includes a log information storage unit 1141, an organization information storage unit 1142, a user information storage unit 1143, a license information storage unit 1144, a device information storage unit 1145, a temporary image storage unit 1146, a job information storage unit 1147, and an application-specific setting information storage unit 1148.

The log information storage unit 1141 stores log information. The organization information storage unit 1142 stores organization information described below. The user information storage unit 1143 stores user information described below. The license information storage unit 1144 stores license information described below. The device information storage unit 1145 stores device information described below.

The temporary image storage unit 1146 stores a temporary image. A temporary image is, for example, a file or data of a scan image to be processed by the worker 1132. The job information storage unit 1147 stores information (job information) of a request relevant to a process (job). The application-specific setting information storage unit 1148 stores setting information unique to the applications 1101.

The service providing system 1100 functions as an integrated base for providing a common service such as a workflow relevant to authentication/authorization and image processing, and a group of services providing application services by using the function of the integrated base, such as a scan service, a print service, and a portal service. The integrated base is constituted by, for example, the common services 1102, the database 1103, and the platform API 1104. The group of services is constituted by, for example, the applications 1101.

Note that the classification form of the process blocks of the service providing system 1100 illustrated in FIG. 4 is one example; that is, the applications 1101, the common services 1102, and the database 1103 do not necessarily have to be classified into a hierarchy as illustrated in FIG. 4. As long as the process of the service providing system 1100 according to the first embodiment can be performed, the hierarchical relationship illustrated in FIG. 4 is not limited to a particular relationship.

FIG. 5 is a table illustrating an exemplary data configuration of organization information. The organization information illustrated in FIG. 5 includes, as information items, an organization ID, an organization name, a country, a language, and address information, for example. The organization ID is information for identifying a group such as a company and a department. The organization ID is not limited to information specifically identifying the organization itself but may be in other forms such as information identifying a subscription, for example. Note that the organization ID is unique.

The organization name is the name of a group such as a company and department. The country indicates the country where a group such as a company and a department is located. The language indicates the language used by a group such as a company and a department. The address information indicates an email address of a group such as a company and a department.

FIG. 6 is a configuration diagram of an example of user information. The user information illustrated in FIG. 6 includes, as information items, an organization ID, a user ID, a password, and address information. The user ID and the password are information for identifying a user. The user ID may be a user name, for example. The password is not essential and may be omitted. Note that a user ID and a password managed under the same organization ID are unique but they may overlap with another user name or a password managed under a different organization ID. The address information may be an email address of a user, for example.

Further, as the user name, information for identifying an electronic medium (e.g., IC card) owned by the user may be used. Examples of an electronic medium owned by the user include an IC card, a mobile phone, a tablet terminal, and an electronic book terminal, for example. As the information for identifying the electronic medium, a card ID, a serial ID, a telephone number of a mobile phone, profile information of a terminal, or a combination of the above may be used, for example.

FIG. 7 is a configuration diagram of an example of device information. The device information illustrated in FIG. 8 includes, as information items, an organization ID, device authentication information, office information, and capability. The device authentication information is information used for device authentication, which is performed for determining whether an office device fulfills a particular condition. The device authentication information may be an ID indicating that a particular application is installed in the office device, or a device number indicating a particular office device. The office information indicates, for example, the office at which the office device is installed. The capability indicates, for example, the capability of the office device.

<Processes>

Figure 8:
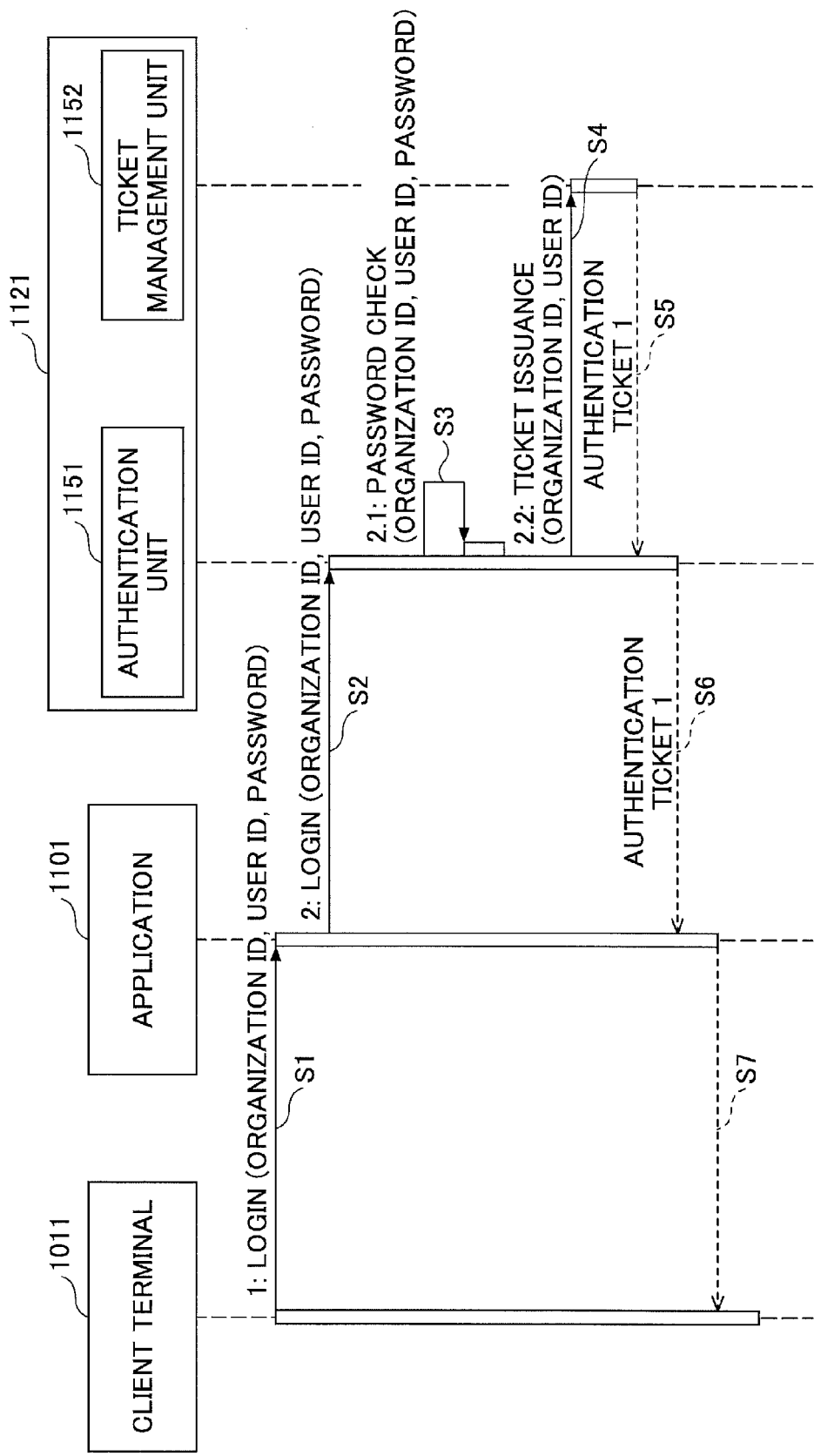
FIG. 8 is a sequence chart illustrating an exemplary login process initiated by a user.

FIG. 8 is a sequence chart illustrating an exemplary login process initiated by a user. The user may operate the client terminal 1011, for example, to input an organization ID, a user ID, and a password that are required for making a login request. The organization ID, the user ID, and the password are examples of user specific information for specifying a user. The login request is an example of a use initiation request. Note that although FIG. 8 illustrates an exemplary case where the login request is issued from the client terminal 1011, the login request may alternatively be issued from other office devices such as the mobile terminal 1012.

In step S1, the client terminal 1011 makes a login request to the application 1101 of the service providing system 1100 designating the user specific information input by the user in the login request. In step S2, the application 1101 makes a login request to the authentication/authorization unit 1121 designating the user specific information. Note that the login request of step S2 may be made using an authentication API included in the platform API 1104, for example.

The authentication/authorization unit 1121 includes an authentication unit 1151 and a ticket management unit 1152 as sub-modules. The authentication unit 1151 of the authentication/authorization unit 1121 handles the login request from the application 1101. In step S3, the authentication unit 1151 checks whether the user specific information designated in the login request matches user specific information stored in the user information storage unit 1143, for example.

If it is confirmed that the user specific information designated in the login request matches the stored user specific information, the authentication unit 1151 makes a ticket issuance request to the ticket management unit 1152 designating the organization ID and the user ID included in the user specific information designated in the login request. In turn, the ticket management unit 1152 issues authentication ticket 1, and registers the organization ID, the user ID, and the authentication ticket 1 in association with each other in a table (see e.g., FIG. 10 described below).

In step S5, the ticket management unit 1152 returns the issued authentication ticket 1 to the authentication unit 1151. In step S6, the authentication unit 1151 returns the authentication ticket 1 to the application 1101 corresponding to the sender of the login request. Note that in returning the authentication ticket 1 in step S6, the authentication ticket 1 may be set up in a cookie, for example.

Then, in step S7, the application 1101 returns the authentication ticket 1 to the client terminal 1101 corresponding to the sender of the login request. In this way, the client terminal 1011 may acquire the authentication ticket 1 issued in response to the login operation by the user.

Figure 9:
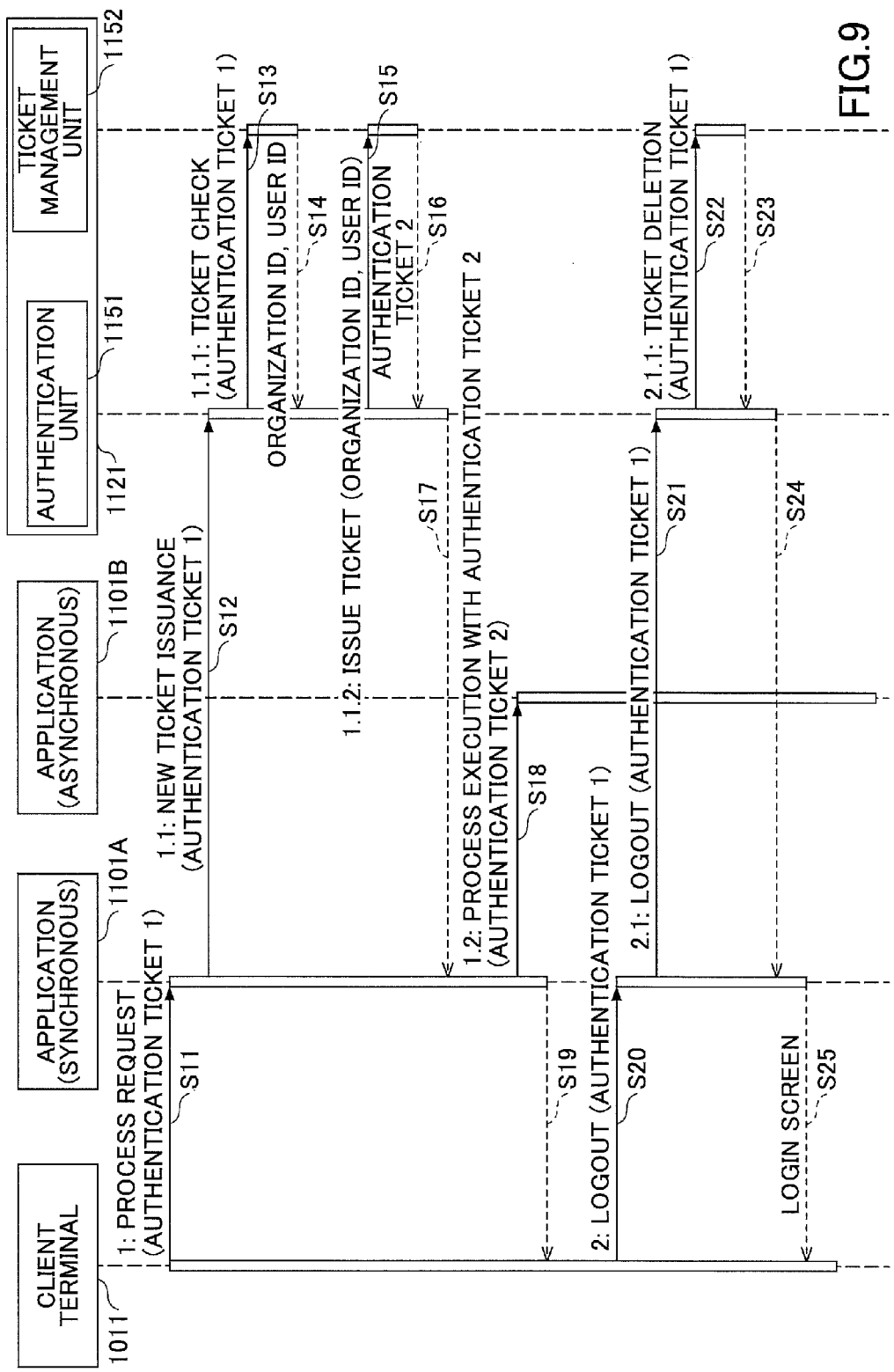
FIG. 9 is a sequence chart illustrating an exemplary process that may be executed when a user makes a process request.

The user may use the authentication ticket 1 acquired by the login process of FIG. 8 to make a process request to the service providing system 1100 as illustrated in FIG. 9, for example. FIG. 9 is a sequence chart illustrating an exemplary process that may be executed when the user makes a process request to the service providing system 1100. Note that in the example illustrated in FIG. 9, the applications 1101 include an application 1101A that executes a synchronous process and an application 1101B that executes an asynchronous process.

In step S11, the client terminal 1011 makes a process request to the application 1101A of the service providing system 1100 using the acquired authentication ticket 1 (i.e., valid authentication ticket). The application 1101A determines whether the process requested by the process request from the client terminal 1011 is an asynchronous process.

If the requested process is an asynchronous process, in step S12, the application 1101A makes a new ticket issuance request to the authentication/authorization unit 1121 designating the authentication ticket 1. The new ticket issuance request of step S12 may be made using the authentication API included in the platform API 1104, for example.

In step S13, the authentication unit 1151 makes a request to the ticket management unit 1152 to check the authentication ticket 1 designated in the new ticket issuance request. The ticket management unit 1152 refers to the table (see e.g., FIG. 10 described below) to check whether the authentication ticket 1 is registered. If the authentication ticket 1 is registered in the table, the ticket management unit 1152 may determine that the authentication ticket 1 is a valid ticket. Upon confirming that the authentication ticket 1 is registered, in step S14, the ticket management unit 1152 refers to the table and returns an organization ID and a user ID that are stored in association with the authentication ticket 1 to the authentication unit 1151.

In step S15, the authentication unit 1151 makes a ticket issuance request to the ticket management unit 1152 designating the organization ID and the user ID associated with the authentication ticket 1. In turn, the ticket management unit 1152 issues authentication ticket 2 and registers the authentication ticket 2 in association with the organization ID and the user ID in the table as illustrated in FIG. 10, for example.

Figures 10, 11:
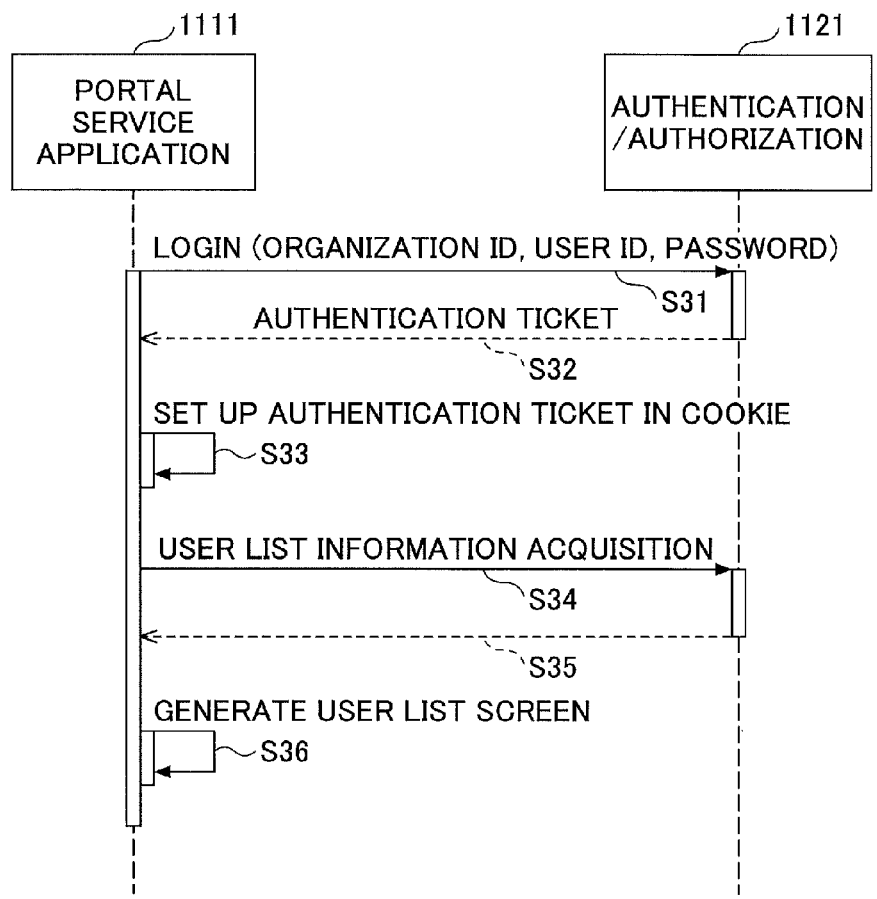
FIG. 10 illustrates an exemplary data configuration of a table storing information managed by a ticket management unit.
FIG. 11 is a sequence chart illustrating an exemplary user list display process.

FIG. 10 illustrates an exemplary data configuration of the table storing information managed by the ticket management unit 1152. The table illustrated in FIG. 10 is for storing an organization ID, a user ID, and an issued authentication ticket in association with each other. In FIG. 10, the authentication ticket 1 and the authentication ticket 2 are stored in association with company A (organization ID) and user A (user ID).

As described above, in the table managed by the ticket management unit 1152, the authentication ticket 1 designated in the new ticket issuance request is not discarded but is instead registered together with the authentication ticket 2 issued in response to the new ticket issuance request.

In step S16, the ticket management unit 1152 returns the issued authentication ticket 2 to the authentication unit 1151. Then, in step S17, authentication unit 1151 returns the authentication ticket 2 to the application 1101A corresponding to the sender of the new ticket issuance request. Note that the authentication ticket 2 may be returned in step S17 by setting up the authentication ticket 2 in a cookie, for example.

In step S18, the application 1101A makes a process execution request designating the authentication ticket 2 to the application 1101B for prompting the application 110B to execute the requested asynchronous process using the authentication request 2. Upon receiving the process execution request designating the authentication ticket 2, the application 1101B starts the requested asynchronous process under the authority of user A (logged-in user).

In step S19, the application 1101A returns a response to the process request received in step S11. After step S19, the user operates the client terminal 1011 to issue a logout request. Note that the logout request is an example of a use termination request.

In step S20, the client terminal 1011 makes a logout request to the application 1101A for prompting the application 1101A to perform a logout operation using the authentication ticket 1. In step S21, the application 1101A makes a logout request designating the authentication ticket 1 to the authentication/authorization unit 1121. Note that the logout request of step S21 may be made using the authentication API included in the platform API 1104, for example.

In step S22, the authentication unit 1151 sends a ticket deletion request designating the authentication request 1 to the ticket management unit 1152 for prompting the ticket management unit 1152 to discard (delete) the authentication ticket 1. In turn, the ticket authentication unit 1152 deletes the authentication ticket 1 from the table as illustrated in FIG. 10. In step S23, the ticket management unit 1152 returns a response to the ticket deletion request received in step S22 to the authentication unit 1151. In step S24, the authentication unit 1151 returns a response to the logout request received in step S21 to the application 1101A.

Then, the application 1101A returns a login screen as a response to the logout request received in step S20 to the client terminal 1011. In turn, the client terminal 1011 displays the login screen, and in this way, the user may be notified of the completion of the logout operation.

According to the process illustrated in FIG. 9, when a process request is made by user A with a valid authentication ticket 1, an authentication ticket 2 is generated that is not discarded even after the user A logs out. Accordingly, even when the authentication ticket 1 is discarded after the user A logs out, the authentication ticket 2 associated with the user A remains registered in the table. In this way, the application 1101B may continue execution of the asynchronous process under the authority of the user A even after the user A logs out.

Note that although not illustrated in FIG. 9, when the application 1101B completes the asynchronous process, the application 1101B may issue a logout request designating the authentication ticket 2, and in this way, the authentication ticket 2 may be deleted from the table illustrated in FIG. 10. Note that the authentication ticket 2 cannot be discarded (deleted) by the user. Also, the new ticket issuance request of step S12 can be used even when a corresponding account is locked.

As can be appreciated from the above descriptions, in the service providing system 1100 according to the first embodiment, when a process that requires a long time is executed asynchronously under the authority of a user, execution of the asynchronous process under the authority of the user may be continued even after the user logs out.

Specific Examples

In the following, exemplary uses of the authentication ticket 2 (new authentication ticket) that is not discarded even after the user logs out are described.

<<User Management>>

For example, the portal service application 1111 illustrated in FIG. 4 may include a user management function. The user management function of the portal service application 1111 may include importing, exporting, and deleting user information, for example. In some cases, processes for importing, exporting, or deleting user information may take a long time. Accordingly, the authentication ticket 2 (new authentication ticket) that is not discarded even after the user logs out may be used to continue such processes even after the user logs out.

FIG. 11 is a sequence chart illustrating an exemplary user list display process. The user may operate the client terminal 1011, for example, to input an organization ID, a user ID, and a password that are required for logging in. In turn, the client terminal 1011 makes a login request to the portal service application 1111 of the service providing system 1100 designating the user specific information input by the user.

In step S31, the portal service application 1111 makes a login request to the authentication/authorization unit 1121 designating the user specific information input by the user. If authentication using the designated user specific information is successful, the authentication/authorization unit 1121 issues an authentication ticket and registers the issued authentication ticket, the organization ID, and the user ID in association with each other in the table illustrated in FIG. 10.

In step S32, the authentication/authorization unit 1121 returns the issued authentication ticket to the portal service application 1111 corresponding to the sender of the login request. In step S33, the portal service application 1111 sets up the authentication ticket in a cookie, for example. In step S34, the portal service application 1111 makes a user list information acquisition request to the authentication/authorization unit 1121 designating the authentication ticket. In step S35, the portal service application 1111 acquires the user list information from the authentication/authorization unit 1121.

Then, in step S36, the portal service application 1111 generates a user list screen. The portal service application 1111 prompts the client terminal 1011 to display the generated user list screen.

A process of inputting additional user information from a UI (user interface) after prompting the client terminal 1011 to display the user list screen is one example of a synchronous process executed by the portal service application 1111.

Figure 12:
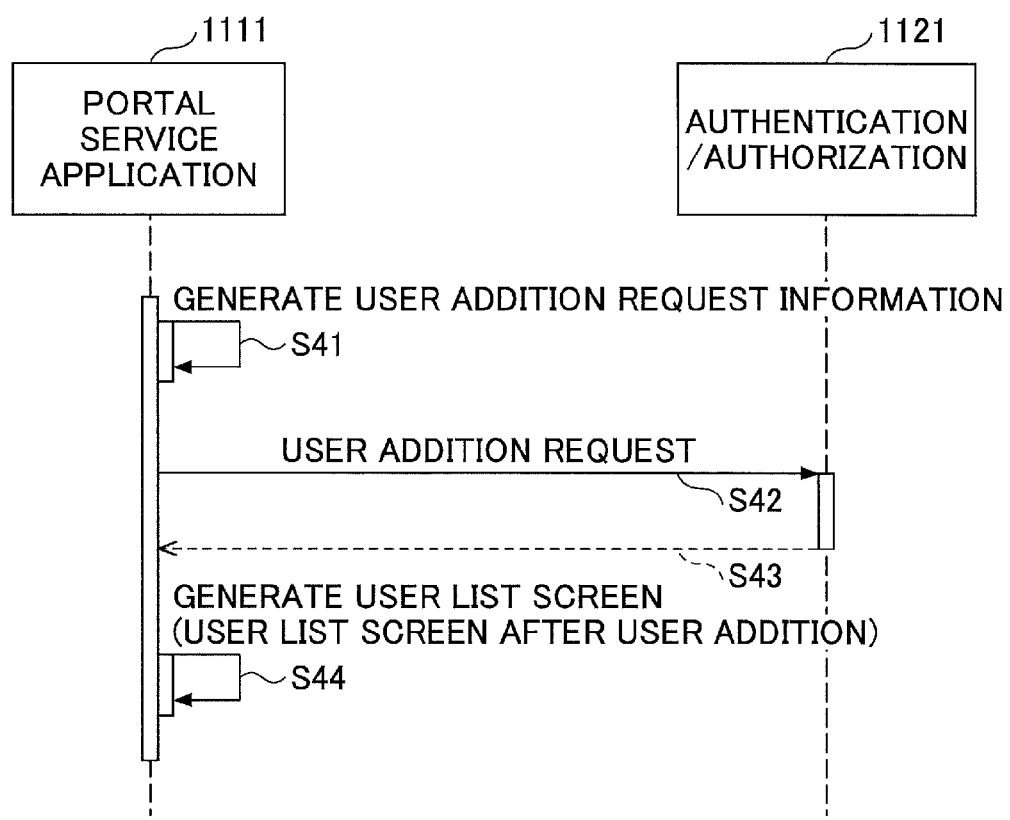
FIG. 12 is a sequence chart illustrating an exemplary process of adding user information from a user interface.

FIG. 12 is a sequence chart illustrating an exemplary process of adding user information from a UI. The user may operate the client terminal 1011, for example, to input additional user information from a UI provided by the portal service application 1111. In step S41, the portal service application 1111 generates user addition request information based on the additional user information input by the user. In step S42, the portal service application 1111 makes a user addition request to the authentication/authorization unit 1121 designating the authentication request.

In step S43, the portal service application 1111 receives a response to the user addition request from the authentication/authorization unit 1121. In step S44, if the user addition process is properly completed, the portal service application 1111 generates a user list screen with the additional user information added thereto. The portal service application 1111 prompts the client terminal 1011 to display the user list screen with the added user information.

In the following, referring to FIGS. 13 and 14, a process of adding user information in a batch from a file is described as an example of an asynchronous process.

Figure 13:
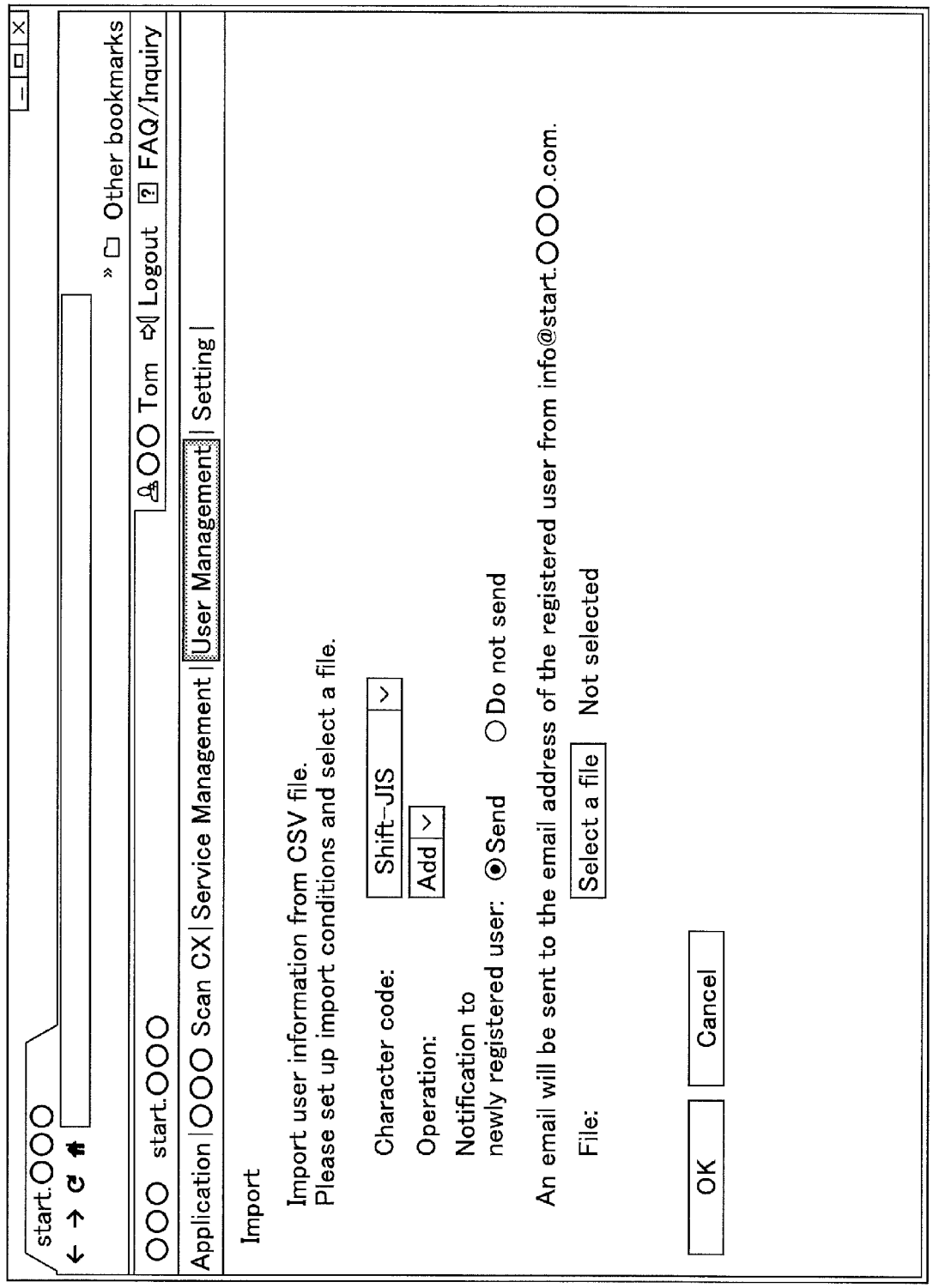
FIG. 13 is an image of an exemplary user interface for importing user information.

The user may operate the client terminal 1011, for example, to input necessary information for executing a process of adding user information in a batch from a file (user information import process) from a UI as illustrated in FIG. 13, for example. FIG. 13 is an exemplary image of the UI for enabling the import process.

The UI illustrated in FIG. 13 is for prompting a user to set up information related to import conditions for importing user information and select the file in which the user information is recorded. The import conditions may include a character code and whether to send a notification to a newly registered user, for example. After setting up the import conditions and selecting the relevant file, the user presses the OK button. In turn, client terminal 1011 makes a request to the portal service application 1111 to execute the process of importing the user information from the selected file.

Figure 14:
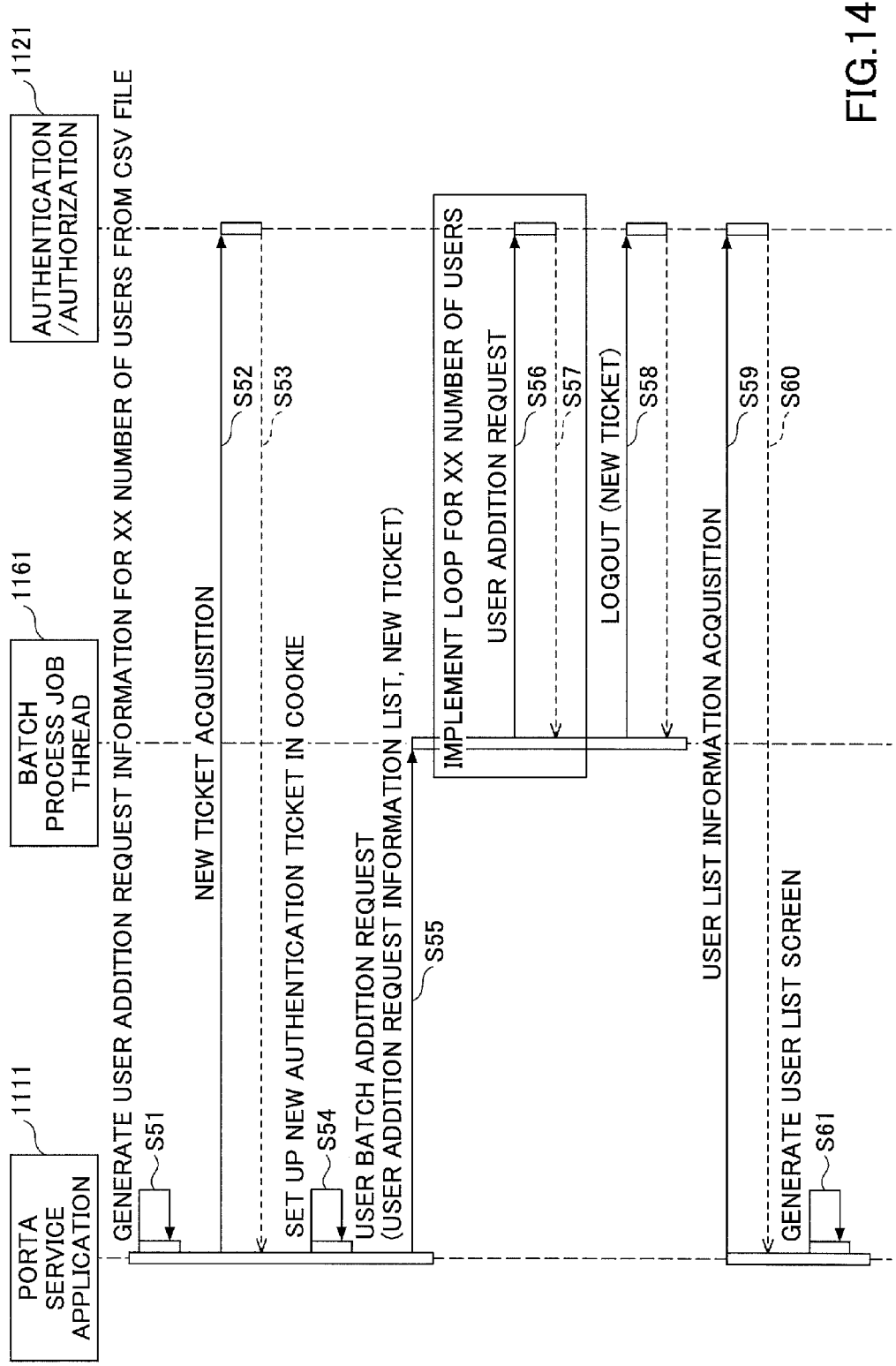
FIG. 14 is a sequence chart illustrating an exemplary process of adding user information from a file.

FIG. 14 is a sequence chart illustrating an exemplary process of adding user information from a file. The user may operate the client terminal 1011, for example, to input necessary information for executing the user information import process from the UI illustrated in FIG. 13. In step S51, the portal service application 1111 generates user addition request information based on the information necessary for executing the user information import process input by the user via the UI and the file storing user information of the number of users to be added.

In step S52, because the process of importing the user information from a file requested by the client terminal 1011 corresponds to an asynchronous process, the portal service application 1111 sends a new ticket issuance request to the authentication/authorization unit 1121 designating the authentication ticket acquired by the login process.

Note that the process steps of the authentication/authorization unit 1121 executed in response to the new ticket issuance request made in step S52 may be identical to steps S13-S16 illustrated in FIG. 9 so that their descriptions are omitted. Then, in step S53, the authentication/authorization unit 1121 returns the newly issued authentication ticket to the portal service application 1111 corresponding to the sender of the new ticket issuance request. In step S54, the portal service application 1111 sets up the new authentication ticket in a cookie.

In step S55, the portal service application 1111 makes a user batch addition request to a batch process job thread 1161 designating the new authentication ticket and a list of user addition request information. Note that the batch process job thread 1161 is an example of a process agent that handles the user addition request on behalf of the portal service application 1111.

The batch process job thread 1161 loops process steps S56-S57 for the number of users included in the list of user addition request information. In step S56, the batch process job thread 1161 makes a user addition request to the authentication/authorization unit 1121 designating the new authentication ticket. In step S57, the batch process job thread 1161 receives a response to the user addition request from the authentication/authorization unit 1121.

After looping steps S56-57 for the number of users included in the list of user addition request information, the batch process job thread 1161 makes a logout request to the authentication/authorization unit 1121 designating the new authentication request.

In step S59, the portal service application 1111 makes a user list information acquisition request to the authentication/authorization unit 1121 asynchronously with respect to the process executed by the batch process job thread 1161. In step S60, the portal service application 1111 acquires user list information from the authentication/authorization unit 1121. The user list information acquired by the portal service application 1111 reflects the user information addition implemented by the batch process job thread 1161. For example, if the user information addition by the batch process job thread 1161 is partially completed, the user list information acquired by the portal service application 1111 reflects the partially completed addition of user information.

Then, in step S61, the portal service application 1111 generates a user list screen. The portal service application 1111 prompts the client terminal 1011 to display the generated user list screen.

In the process illustrated in FIG. 14, a new ticket that is not discarded even after the user logs out is generated upon importing user information, and in this way, the user information import process executed by the batch process job thread 1161 may be continued even after the user logs out. Note that use of the new authentication ticket is not limited to the case of importing user information. For example, the new authentication ticket may similarly be used in exporting user information or deleting user information.

<<Job Process>>

For example, the scan service application 1112 illustrated in FIG. 4 may include a function for registering and executing a job. In some cases, such a job process may take a long time. Accordingly, the authentication ticket 2 (new authentication ticket) that is not discarded even after the user logs out as described above may be used to enable the scan service application 1112 to continue the job process even after the user logs out.

FIG. 15 is sequence chart illustrating an exemplary information acquisition/setting process. The user may operate the client terminal 1011, for example, to input an organization ID, a user ID, and a password that are required for logging in. In turn, the client terminal 1011 may make a login request to the portal service application 1111 of the service providing system 1100 designating the user specific information input by the user.

In step S71, the portal service application 1111 makes a login request to the authentication/authorization unit 1121 designating the user specific information input by the user. If the authentication based on the user specific information designated in the login request is successful, the authentication/authorization unit 1121 generates an authentication ticket and registers the generated authentication ticket, the organization ID, and the user ID in association with each other in the table illustrated in FIG. 10. In step S72, the authentication/authorization unit 1121 returns the authentication ticket to the portal service application 1111 corresponding to the sender of the login request.

The portal service application 1111 sets up the authentication ticket in a cookie. In step S73, the portal service application 1111 makes an information acquisition/setting request to the scan service application 1112 designating the authentication request. In step S74, the scan service application 1112 acquires the authentication ticket from the cookie.

In steps S75 and S76, the scan service application 1112 makes an information acquisition request to the authentication/authorization unit 1121 based on the information acquisition/setting request from the portal service application 1111 and acquires the requested information.

In step S77, the scan service application 1112 makes an information acquisition/setting request to the common services 1102 to set up the information acquired from the authentication/authorization unit 1121 based on the information acquisition/setting request from the portal service application 1111. The information is set up by the common services 1102 as requested, and in step S78, a result of the setting operation is returned from the common services 1102 to the scan service application 1112. In step S79, the scan service application 1112 returns a response to the information acquisition/setting request from the portal service application 1111.

Note that the information acquisition/setting process illustrated in FIG. 15 is an example of a synchronous process. In the following, referring to FIG. 16, a job registration process is described as an example of an asynchronous process. FIG. 16 is a sequence chart illustrating an exemplary job registration process.

In step S81, the portal service application 1111 makes a login request to the authentication/authorization unit 1121 designating the user specific information input by the user. If authentication based on the user specific information designated in the login request is successful, the authentication/authorization unit 1121 issues an authentication ticket and registers the issued authentication ticket, the organization ID, and the user ID in association with each other in the table illustrated in FIG. 10. In step S82, the authentication/authorization unit 1121 returns the authentication ticket to the portal service application 1111 corresponding to the sender of the login request.

The portal service application 1111 sets up the authentication ticket in a cookie, for example. In step S83, the portal service application 1111 makes a job registration request to the scan service application 1112 designating the authentication ticket. The scan service application 1112 acquires the authentication ticket from the cookie.

In steps S84 and S85, the scan service application 1112 makes an information acquisition request to the authentication/authorization unit 1121 based on the job registration request from the portal service application 1111 and acquires the requested information from the authentication/authorization unit 1121.

Also, in step S86, because the job registration process corresponds to an asynchronous process, the scan service application 1112 makes a new ticket issuance request to the authentication/authorization unit 1121 designating the authentication ticket obtained from the login operation.

Note that the process steps executed by the authentication/authorization unit 1121 in response to the new ticket issuance request of step S86 may be identical to steps S13-S16 of FIG. 9 so that their descriptions are omitted. Then, in step S87, the authentication/authorization unit 1121 returns the new authentication ticket to the scan service application 1112 corresponding to the sender of the new ticket issuance request. In step S88, the scan service application 1112 sets up the new authentication ticket in a cookie.

In step S89, the scan service application 1112 makes a job registration request to the image processing workflow control unit 1127 designating the new authentication ticket. In step S90, the image processing workflow control unit 1127 returns a job registration result to the scan service application 1112. Then, in step S91, the scan service application 1112 returns a response to the job registration request from the portal service application 1111.

Note that the image processing workflow control unit 1127 may include a callback function for calling back a designated application after a job is completed. Job information of the job registered in the image processing workflow control unit 1127 by the scan service application 1112 in step S89 may have a data configuration as illustrated in FIG. 17, for example.

FIG. 17 illustrates an exemplary data configuration of job information. The job information of FIG. 17 includes a portion 5 related to a definition of the job and a portion 6 related to a definition of a task. The portion 5 related to the definition of the job includes a job ID, a user ID, an organization ID, an application ID, a callback URL, and cookie information required for callback, for example. The portion 6 related to the definition of the task include a task ID, a parent job ID, type, and parameters, for example.

The user ID is information indicating the user requesting execution of the job. The organization ID is information indicating the organization requesting execution of the job. The application ID is information indicating the application 1101 requesting execution of the job. The callback URL is information indicating the URL that is to be called back after completion of the job. The cookie information required for callback is information to be used upon calling back the application 1101.

Note that in the example illustrated in FIG. 16, the URL of the scan service application 1112 may be set up as the callback URL and the new authentication ticket may be set up in the cookie information required for callback.

FIG. 18 is a sequence chart illustrating an exemplary process that may be executed upon callback. After a job is completed, the image processing workflow control unit 1127 may read the callback URL included in the portion 5 related to the definition of the job of the job information as illustrated in FIG. 17. FIG. 18 illustrates an exemplary case where the URL of the scan service application 1112 is set up as the callback URL.

In step S101, the image processing workflow control unit 1127 notifies the scan service application 1112 of the job completion (i.e., calls back the scan service application 1112). Note that in step S101, the image processing workflow control unit 1127 may use the cookie information required for callback included in the portion 5 related to the definition of the job of the job information illustrated in FIG. 17 to attach the new authentication ticket used for executing the job to the callback.

In step S102, the scan service application 1112 acquires the new authentication ticket from the callback. In step S103, the scan service application 1112 makes a request for services such as updating information to the common services 1102. In step S104, the scan service application 1112 receives a response to the request for services such as updating information from the common services 1102.

In step S105, the scan service application 1112 makes a logout request to the authentication/authorization unit 1121 designating the new authentication ticket. In turn, the authentication/authorization unit 1121 deletes the new authentication ticket designated in the logout request from the table.

In step S106, the authentication/authorization unit 1121 returns a response to the logout request received in step S105. Then, in step S107, the scan service application 1112 returns a response to the callback of step S101 to the image processing workflow control unit 1127.

As can be appreciated, in the job registration process as illustrated in FIG. 16, a new authentication ticket that is not discarded even after the user logs out is issued so that the image processing workflow control unit 1127 may continue execution of processes related to the job even after the user logs out.

Also, in the job registration process as illustrated in FIG. 16, a callback URL to be called upon job completion and cookie information required for callback may be set up in the job information of the job that is registered so that authentication may be omitted upon callback. Further, in the process illustrated in FIG. 18, the new authentication ticket used for executing the job is attached to the callback and conveyed from the image processing workflow control unit 1127 to the scan service application 1112. In this way, the scan service application 1112 may be able to logout using the new authentication ticket.

SUMMARY

In the service providing system 1100 according to the first embodiment, when a process that takes a long time is executed asynchronously under the authority of a user, even after the user logs out, the process may continue to be executed under the authority of the logged out user.

The present invention is not limited to the specific embodiments described herein, and variations and modifications may be made without departing from the spirit and scope of the present invention.

Note that the portal service application 1111 described above corresponds to an exemplary embodiment of a receiving unit. The authentication/authorization unit 1121 corresponds to an exemplary embodiment of an authentication unit. The application 1101B for executing an asynchronous process, the batch process job thread 1161, and the image processing workflow control unit 1127 correspond to exemplary embodiments of an execution unit.

Also, the office device such as the client terminal 1011 corresponds to an exemplary embodiment of an external device. The user information storage unit 1143 corresponds to an exemplary embodiment of a first storage unit. The table as illustrated in FIG. 10 corresponds to an exemplary embodiment of a second storage unit. The cookie information required for callback corresponds to an exemplary embodiment of information required for notifying a notification destination of a completion of the requested process execution. The organization ID corresponds to an exemplary embodiment of organization identification information. The authentication ticket corresponds to an exemplary embodiment of authentication information indicating that authentication has been completed. The new authentication ticket corresponds to exemplary new authentication information.

The present application is based on and claims the benefit of priority of Japanese Patent Application No. 2013-021265, filed on Feb. 6, 2013, the entire contents of which are hereby incorporated herein by reference.

What is claimed is:

1. An information processing system comprising: one or more hardware processors; and
one or more memories containing instructions that, when executed, cause the one or more hardware processors to:
receive from an external device a use initiation request designating user specific information and organization identification information, the use initiation request designating a process to be performed by the information processing system;
store first authentication information in association with user specific information when the user specific information and the organization identification information designated in the use initiation request are stored in association with each other in a first storage that stores one or more sets of user specific information in association with the organization identification information;
determine whether the process designated by the use initiation request is an asynchronous process;
after determining that the process designated by the use initiation request is an asynchronous process, store second authentication information in association with the user specific information while the first authentication information remains stored in association with the user specific information; and use the second authentication information during execution of the asynchronous process;

wherein the second authentication information is used even after a use termination request designating the first authentication information is made.

2. The information processing system according to claim 1, wherein the instructions, when executed, cause the one or more hardware processors to:

issue the second authentication information when the first authentication information, which is designated in a new authentication information issuance request, is stored in a second storage that stores one or more sets of authentication information that have been issued.

3. The information processing system according to claim 1, wherein the use initiation request includes the first authentication information; and wherein the instructions, when executed, cause the one or more hardware processors to a new authentication information issuance request designating the first authentication information included in the use initiation request.

4. The information processing system according to claim 3, wherein the instructions, when executed, cause the one or more hardware processors to:

make an asynchronous process execution request designating the second authentication information.

5. The information processing system according to claim 3, wherein the asynchronous process relates to at least one of importing, exporting, and deleting user information.

6. The information processing system according to claim 4, wherein the instructions, when executed, cause the one or more hardware processors to:

when making the asynchronous process execution request designating the second authentication information, send the second authentication information as information required for notifying a notification destination of a completion of the asynchronous process.

7. An information processing device comprising: one or more hardware processors; and one or more memories containing instructions that, when executed, cause the one or more hardware processors to:

receive from an external device a use initiation request designating user specific information and organization identification information, the use initiation request designating a process to be performed by the information processing system;

store first authentication information in association with user specific information when the user specific information and the organization identification information designated in the use initiation request are stored in association with each other in a first storage that stores one or more sets of user specific information in association with the organization identification information;

determine whether the process designated by the use initiation request is an asynchronous process;

after determining that the process designated by the use initiation request is an asynchronous process, store second authentication information in association with the user specific information while the first authentication information remains stored in association with the user specific information; and use the second authentication information during execution of the asynchronous process;

wherein the second authentication information is used even after a use termination request designating the first authentication information is made.

8. An authentication information management method executed by an information processing system including one or more information processing devices, the authentication information management method comprising:

receiving from an external device a use initiation request designating user specific information and organization identification information, the use initiation request designating a process to be performed by the information processing system;

store first authentication information in association with user specific information when indicating the user specific information and the organization identification information designated in the use initiation request are stored in association with each other in a first storage that stores one or more sets of user specific information in association with the organization identification information;

determine whether the process designated by the use initiation request is an asynchronous process;

after determining that the process designated by the use initiation request is an asynchronous process, store second authentication information in association with the user specific information while the first authentication information remains stored in association with the user specific information; and use the second authentication information during execution of the asynchronous process;

wherein the second authentication information is used even after a use termination request designating the first authentication information is made.

* * * * *